(12) United States Patent
Chik et al.

(10) Patent No.: US 8,093,604 B2
(45) Date of Patent: Jan. 10, 2012

(54) ENGINEERED STRUCTURE FOR SOLID-STATE LIGHT EMITTERS

(75) Inventors: George Chik, Nepean (CA); Thomas MacElwee, Nepean (CA); Iain Calder, Kanata (CA); Steven E. Hill, Ottawa (CA)

(73) Assignee: Group IV Semiconductor, Inc., Ottawa (CA)

( * ) Notice: Subject to any disclaimer, the term of this patent is extended or adjusted under 35 U.S.C. 154(b) by 153 days.

(21) Appl. No.: 11/642,788

(22) Filed: Dec. 21, 2006

(65) Prior Publication Data

US 2008/0093608 A1    Apr. 24, 2008

Related U.S. Application Data

(60) Provisional application No. 60/786,730, filed on Mar. 29, 2006, provisional application No. 60/754,185, filed on Dec. 28, 2005.

(51) Int. Cl.
*H01L 33/00* (2010.01)
(52) U.S. Cl. ............. 257/89; 257/88; 257/E33.012
(58) Field of Classification Search ............ 257/86, 257/89, 88, 98, E33.012
See application file for complete search history.

(56) References Cited

U.S. PATENT DOCUMENTS

| | | | |
|---|---|---|---|
| 4,326,007 A | 4/1982 | Williams et al. | 428/333 |
| 5,248,890 A | 9/1993 | Luth et al. | 257/102 |
| 5,796,120 A | 8/1998 | Summers et al. | 257/30 |
| 5,920,086 A | 7/1999 | MacFarlane et al. | 257/103 |
| 7,081,664 B2 | 7/2006 | Hill | |
| 7,122,842 B2 | 10/2006 | Hill | |
| 2001/0010449 A1* | 8/2001 | Chiu et al. | 313/501 |
| 2002/0153522 A1* | 10/2002 | Park et al. | 257/16 |
| 2004/0151461 A1 | 8/2004 | Hill | |
| 2004/0214362 A1* | 10/2004 | Hill et al. | 438/33 |
| 2004/0252738 A1 | 12/2004 | Hill | |
| 2005/0037232 A1* | 2/2005 | Tyan et al. | 428/690 |
| 2005/0051777 A1* | 3/2005 | Hill | 257/72 |
| 2005/0224813 A1 | 10/2005 | Liu et al. | |

FOREIGN PATENT DOCUMENTS

| | | |
|---|---|---|
| EP | 1134799 | 9/2001 |
| WO | WO02/061815 | 8/2002 |
| WO | 2004025999 | 3/2004 |
| WO | 2006049449 | 5/2006 |

OTHER PUBLICATIONS

Hsu C T. et al., "Effects of Insulating Layers and Active Layer on ZNS:TB, F Thin-Film Electroluminescent Devices", Japanese Journal of Applied Physics, Japan Society of Applied Physics, JP, vol. 32, No. 5A, Part 01, May 1, 1993, pp. 1983-1986, XP000413930.
Rozo C. et al., "Spectroscopic Study of Rare Earth Doped Nano-Crystalline Silicon in SiO2 Films", Materials Research Society Symposium Proceedings, Materials Research Society, USA, vol. 737, Jan. 1, 2003, pp. 517-522, XP002310621.
European Search Report for EP application No. 06840558, which corresponds to U.S. Appl. No. 11/642,788.

\* cited by examiner

*Primary Examiner* — Marcos D. Pizarro
*Assistant Examiner* — Eva Yan Montalvo
(74) *Attorney, Agent, or Firm* — Teitelbaum & MacLean; Neil Teitelbaum; Doug MacLean

(57) ABSTRACT

An engineered structure of a light emitting device comprises multiple layers of alternating active and buffer materials disposed between AC or DC electrodes, which generate an electric field. The active layers comprise luminescent centers, e.g. group IV semiconductor nanocrystals, in a host matrix, e.g. a wide bandgap semiconductor or dielectric material such as silicon dioxide or silicon nitride. The buffer layers are comprised of a wide bandgap semiconductor or dielectric material, and designed with a thickness, in the direction of an applied electric field, that ensures that electrons passing therethrough picks up enough energy to excite the luminescent centers in the adjacent active layer at an excitation energy to emit light efficiently at a desired wavelength.

31 Claims, 4 Drawing Sheets

ENGINEERED STRUCTURE FOR SOLID-STATE LIGHT EMITTERS

CROSS-REFERENCE TO RELATED APPLICATIONS

The present invention claims priority from U.S. Patent Application No. 60/754,185 filed Dec. 28, 2005, and 60/786,730 filed Mar. 29, 2006, which is incorporated herein by reference.

TECHNICAL FIELD

The invention relates to solid-state lighting devices, and in particular to engineered structures of semiconductor films including luminescent centers for use in solid-state light emitters.

BACKGROUND OF THE INVENTION

The next generation of solid-state lighting is seeking to provide advances in brightness, efficiency, color, purity, packaging, scalability, reliability and reduced costs. The creation of light emitting devices from silicon based materials, upon which the modern electronic industry is built, has been the subject of intensive research and development around the world. The main obstacle has been the indirect energy gap of bulk silicon, which limits the efficiency to an extremely low level. However, one particular technology, based on silicon nano-particles, e.g. nanocrystals, formed through various techniques, has been able to overcome this difficulty.

Prior art light emitting devices, such as those disclosed in U.S. Pat. Nos. 7,081,664, entitled: "Doped Semiconductor Powder and Preparation Thereof", issued Jul. 25, 2006 in the name of Hill; and 7,122,842, entitled Solid State White Light Emitter and Display Using Same, issued Oct. 17, 2006 to Hill; and United States Published Patent Applications Nos. 2004/151461, entitled: "Broadband Optical Pump Source for Optical Amplifiers, Planar Optical Amplifiers, Planar Optical Circuits and Planar Optical Lasers Fabricated Using Group IV Semiconductor Nanocrystals", published Aug. 5, 2004 in the name of Hill; 2004/214,362, entitled: "Doped Semiconductor Nanocrystal Layers and Preparation Thereof", published Oct. 28, 2004 in the name of Hill et al; and 2004/252,738, entitled: "Light Emitting Diodes and Planar Optical Lasers Using IV Semiconductor Nanocrystals", published Dec. 16, 2004 in the name of Hill, which are incorporated herein by reference, have demonstrated that using silicon-rich silicon oxide (SRSO), which consists of silicon nano-particles embedded in a silicon dioxide ($SiO_2$ or glass) matrix, reduces many of the problems associated with bulk silicon, and when doped with erbium, or other rare earth material, can exhibit efficient room temperature rare earth luminescence, because of the high efficiency of the energy transfer process from excited nanocrystals to rare earth ions. Accordingly, the SRSO provides an alternative to thin film electroluminescent material. The silicon nano-particles act as classical sensitizer atoms that absorb incident photons or electrons and then transfer the energy to the rare earth ions, which then fluoresce in the infrared or visible wavelength ranges with several advantages compared to the direct fluorescence of the rare earth. First, the absorption cross-section of the silicon nano-particles is larger than that of the rare earth ions by more than three orders of magnitude. Second, as excitation occurs via an Auger-type interaction or via a Förster transfer process between carriers in the silicon nanoparticles and rare earth ions, incident photons need not be in resonance with one of the narrow absorption bands of the rare earth. Unfortunately, existing approaches to developing such silicon nano-particle materials have only been successful at producing very low concentrations of the rare earth element, which is not sufficient for many practical applications.

Observations have shown that silicon nano-particles formed by such techniques generally have a relatively narrow distribution of photo-luminescent (PL) wavelength or energy despite the broad size distribution, i.e. the observed energies are not as high as expected from the quantum confinement of the nanocrystals. The reduced nano-particle excitation energy affects the efficiency of energy transfer from conducting electrons when these structures are electrically powered, thereby severely limiting the efficiency of light generation from such films.

In general, the manufacture of type IV semiconductor nano-particles doped with a rare earth element is done by ion implantation of silicon ions into a silicon oxide layer, followed by high temperature annealing to grow the silicon nano-particles and to reduce the ion implantation damage. The implantation of silicon ions is followed by an ion implantation of the rare earth ions into the annealed silicon nano-particle oxide layer. The resulting layer is again annealed to reduce the ion implant damage and to optically activate the rare earth ion.

There are several problems with this method:

i) it results in a decreased layer surface uniformity due to the ion implantation;

ii) it requires an expensive ion implantation step;

iii) it fails to achieve a uniform distribution of group IV semiconductor nano-particles and rare earth ions unless many implantation steps are carried out;

iv) it requires a balance between reducing the ion implant damage by thermal annealing while trying to maximize the optically active rare earth; and v) the thickness of the film is limited because implanted ions do not penetrate deeply into the film for practical implant energies.

To diminish the above drawbacks, plasma enhanced chemical vapor deposition (PECVD) has been utilized to make group IV semiconductor nano-particle layers. The prepared layers are subjected to a rare earth ion implantation step, and a subsequent annealing cycle to form the group IV semiconductor nano-particles and to optically activate the rare earth ions that are doped in the nano-particle region. Unfortunately, the layers prepared with this method are still subjected to an implantation step, which results in poor surface uniformity, non-uniform distribution of rare earth elements, and limited film thickness.

Another deposition method that has been used to obtain a doped group IV semiconductor nano-particle layer consists of co-sputtering the group IV semiconductor and rare earth metal, typically in an oxygen plasma. In this method, the group IV semiconductor and the rare earth metal were placed on a target substrate, which was then placed into a vacuum chamber and exposed to an argon ion beam. The argon ion beam sputtered off the group IV semiconductor and the rare earth metal, both of which were deposited onto a receiving silicon wafer. The newly formed film on the silicon wafer was then annealed to grow the nano-particles and to optically activate the rare earth ions. The doped group IV semiconductor nano-particle layers made through this method have the drawbacks that: i) the layer does not have a very uniform distribution of nano-particles and rare earth ions; ii) the layer suffers from up conversion efficiency losses due to rare earth clustering in the film; and iii) the concentration of rare earth film in the film is limited to little more than 0.1%.

The concentration of the one or more rare earth elements in the semiconductor nano-particle layers is preferably as high as possible, as the level of response of the film to external stimuli, such as optical stimulation for photoluminescence, is proportional to the concentration. One problem encountered, when a high concentration of rare earth element is present within the semiconductor layer, is that when two rare earth metals come into close proximity with one another, a quenching relaxation interaction occurs that reduces the level of optical response observed. The concentration of the rare earth elements within a semiconductor film is thus balanced to be as high as possible to offer the most fluorescence, but low enough to limit the quenching interactions.

Silicon nano-particles formed by such techniques generally have a relatively wide distribution of size, and a similarly wide spatial distribution, i.e. the separation distance between nano-particles, which affects the efficiency of energy transfer from conducting electrons when these structures are electrically powered. The average distance between nano-particles in the direction of electrical conduction must be large enough so that an electron picks up enough energy from the electric field between nano-particles to excite the light emitting object and produce a photon of the correct colour. However, because the spatial distribution is isotropic, the overall density of nano-particles in these films must be fairly low ($\sim 5\times10^{18}$ cm$^{-2}$). Unfortunately, with such a low nano-particles density, and with a distribution of nano-particle size and separation, severe limitations are set on the efficiency of light generating capability from such films with embedded nano-particles.

When rare earth ions are introduced in the film, it is desirable to locate the rare earth ions in the vicinity of the nano-particles to facilitate efficient energy transfer from the excited nano-particles to the rare earth ions. However, the ion implantation or in situ deposition techniques incorporate a random distribution of rare earth ions. In particular, the generation of white light requires multiple species of rare earths to be incorporated into the films, since each different species provides a different colour. It is impossible to ensure that the correct rare earth ion is located near the appropriate size of nano-particle so that the energy of the excited nano-particle is matched to the emissive wavelength of the rare earth ion. In other words, it is highly likely that the nearest rare earth ion radiates with too short a wavelength, i.e. it cannot be excited by the nano-particle, or too long a wavelength, i.e. energy is wasted in the excitation process. Even if a high enough concentration of rare earths is used to avoid (at least partially) such mismatches of excited nano-particle energy to the radiative emission wavelength of the rare earth ion, losses still arise from interactions between rare earth ions when they are closely spaced.

In the films in which the nano-particles are formed with significant variations in size and separation distance, excess silicon atoms and dopants, such as rare earth ions, are incorporated uniformly throughout the films, but non-uniformly from a local viewpoint. Therefore, there is a chance that some of the excess silicon atoms may be located far from any nucleation site and may not precipitate into the nano-particles, but instead will remain distributed in the silicon dioxide host matrix. In addition, some rare earth ions may also not be located close enough to the nano-particles. Finally, if significant carbon content must be incorporated into the nano-particles to raise their excitation energy, the carbon atoms need to be located close to the nano-particles. It has been observed in general that without carbon incorporation, silicon nanocrystals with 2 nm diameter should have exciton energy of the order of 2.3 eV from the quantum confinement effect, but it is observed that they only radiate in the range of 1.4-1.8 eV. If impurities, such as excess silicon atoms, rare earth ions, and carbon atoms, remain in the oxide matrix, they could severely impact the physical properties of the oxide, particularly the breakdown field and hence device reliability and lifetime.

An object of the present invention is to overcome the shortcomings of the prior art by providing a multi-layered engineered structure in which wide bandgap semiconductor or dielectric buffer layers are disposed adjacent very thin active luminescent layers designed to emit light at a specific wavelength. The buffer layers provide the exact distance in the direction of electrical conduction so that an electron picks up enough energy from the electric field when passing through the buffer layers to excite luminescent centers in the active layers to produce a photon of the correct color via impact ionization or impact excitation.

SUMMARY OF THE INVENTION

Accordingly, the present invention relates to a light emitting structure comprising:

a first active layer including a concentration of luminescent centers for emitting light at a first wavelength;

a first buffer layer comprising a wide bandgap or dielectric material adjacent the first active layer; and a set of electrodes for applying an electric field to the first active and first dielectric layers;

wherein the first buffer layer has a thickness whereby electrons gains sufficient energy from the electric field when passing through the first buffer layer to excite the luminescent centers in the first active layer via impact ionization or impact excitation at a sufficient excitation energy to emit light at the first wavelength.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
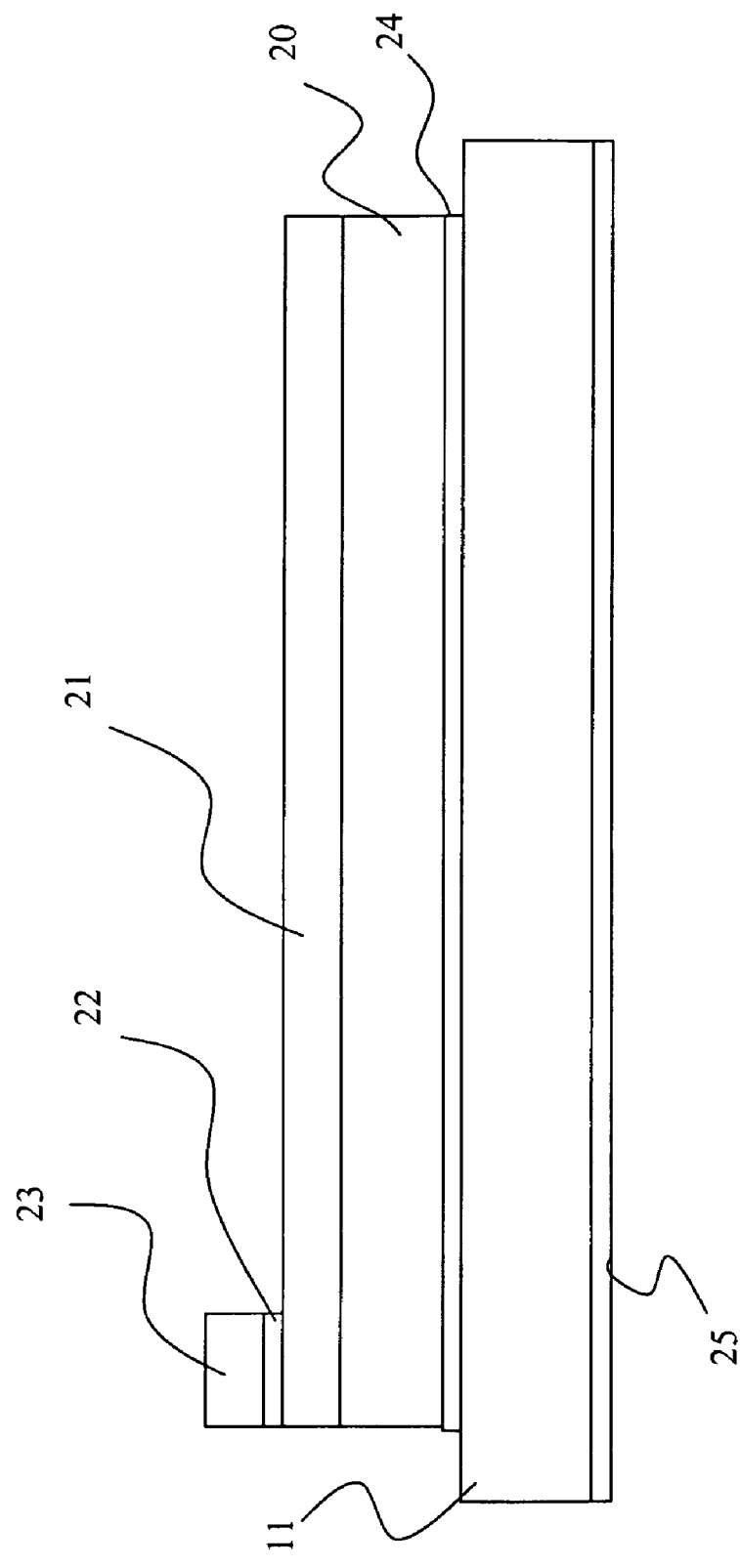
FIG. 1 is a cross-sectional view of an electroluminescent solid-state device in accordance with an embodiment of the present invention.

With reference to FIG. 1, an embodiment of the present invention provides an electroluminescent solid-state device 1, which incorporates a conductive substrate 11, such as an N-type or a P-type silicon wafer. A light-emitting film structure 20, including one or more relatively thin active layers with luminescent centers, e.g. semiconductor nano-particles in a wide bandgap semiconductor dielectric matrix or other semiconductor materials, is deposited onto the top of the conductive substrate 11. The film structure 20 can be deposited by one of many suitable methods, such as plasma enhanced chemical vapor deposition (PECVD), molecular beam epitaxy, pulsed laser deposition, sputtering, and sol-gel processes. An upper optically-transparent, current-injection (electrode) layer 21, e.g. indium tin oxide (ITO), is mounted on the film structure 20, which, along with a back electrical contact 25, enables AC or DC power to be applied thereto. Preferably, the transparent current injection layer 21 has a thickness of from 150 to 500 nm. Preferably, the chemical composition and the thickness of the transparent current-injection layer 21 are such that the light emitting structure 20 has a resistivity of less than 70 ohm-cm. A buffer electrical contact 22, e.g. TiN, is positioned between the transparent current-injection layer 21 and an upper electrical contact 23, e.g. a metal such as aluminum. The buffer electrical contact 22 provides an ohmic contact point between the front transparent current-injection layer 21 and the upper electrical contact 23, while the upper electrical contact 23 provides a suitable surface for wire bonding contact. Other suitable materials for transparent current-injection layer 21 and buffer electrical contact 22 might alternatively be employed. A back reflector 24 can be provided between the film structure 20 and the substrate 11 to reflect light, which is internally emitted towards the substrate 11, back towards the emitting surface, i.e. the transparent current-injection layer 21.

The substrate 11, on which the film structure 20 is formed, is selected so that it is capable of withstanding high temperatures in the order of 1000° C. or more. Examples of suitable substrates include silicon wafers or poly silicon layers, either of which can be n-doped or p-doped, e.g. with $1 \times 10^{20}$ to $5 \times 10^{21}$ of dopants per cm$^3$, fused silica, zinc oxide layers, quartz, sapphire silicon carbide, or metal substrates. The substrate 11 can optionally have a thermally grown oxide layer, which oxide layer can be of up to about 2000 nm in thickness, a thickness of 1 nm to 20 nm being preferred. The substrate 11 can optionally have a deposited electrically conducting layer, which can have a thickness of between 50 and 2000 nm, but preferably between 100 and 500 nm. The thickness of the substrate is not critical, as long as thermal and mechanical stability is retained.

The film structure 20 can be comprised of a single or of multiple active layers, each layer having an independently selected composition and thickness, for example: semiconductor nano-particles, such as a group IV semiconductor (e.g. Si, Ge, Sn and PB) in a wide bandgap semiconductor or dielectric matrix, such as a group IV (e.g. Si, Ge, Sn and Pb) Oxide or Nitride matrix with or without rare earth doping elements and with or without carbon doping, as will hereinafter described. Alternatively, the active layers can be comprised of rare earth oxides or other semiconductor material with luminescent centers activated by impact ionization or impact excitation. By using active layers having different compositions, a multi-color structure can be prepared. For example, combining erbium, thulium and europium doped semiconductor nano-particles layers in a single structure provides a structure that can fluoresce at green (terbium), blue (cerium), and red (europium) or colour combinations thereof, e.g. white. The layers can be either stacked or constructed side by side as separately controllable circuit elements.

Figure 2:
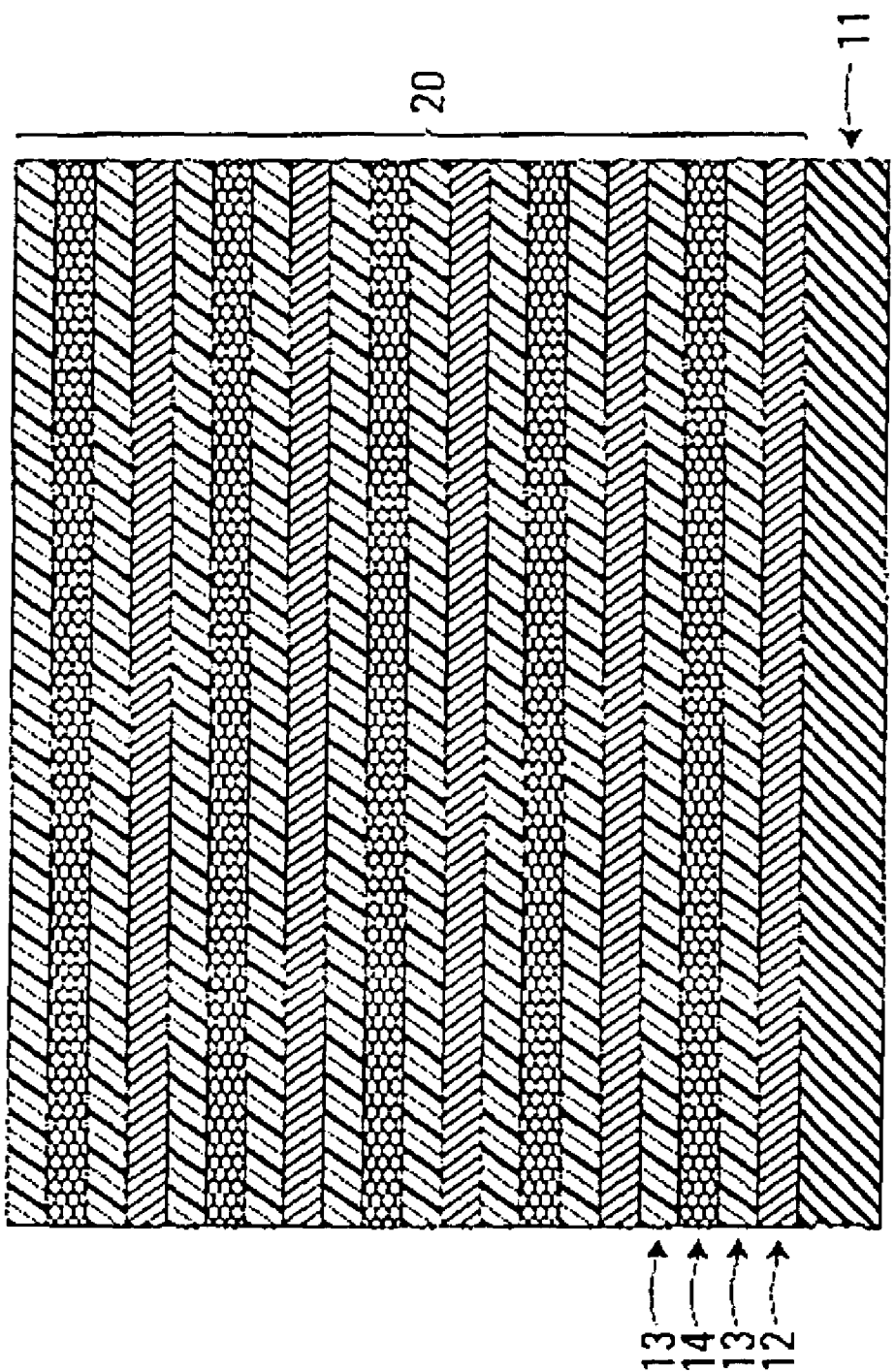
FIG. 2 is a cross-sectional view of a super-lattice semiconductor structure in accordance with the device of FIG. 1.

One type of preferred multi-layer structure 20 provided by an embodiment of the present invention is a super-lattice structure, shown by way of example in FIG. 2, which structure comprises multiple active layers 12 and 14, e.g. semiconductor nano-particle, with wide bandgap semiconductor or dielectric buffer layers 13 on a substrate 11. Each of the active layers 12 and 14 has a thickness of from 1 nm to 10 nm, and is deposited on the substrate 11. Each of the active layers 12 and 14 can comprise the same or different material, e.g. rare earth doping elements, for generating the same or different wavelength of light, e.g. all of the active layers 12 emit one wavelength and all of the active layers 14 emit a second wavelength. The two wavelengths of light generated by the two sets of active layers 12 and 14 are combined together or with additional layers (not shown) to generate a desired color, e.g. white. The active layers 12 and 14 are separated by buffer layers 13, such as silicon dioxide layers. The transparent current injection layer 21 is deposited on top of the multi-layer structure 20 of the super-lattice structure. There is no maximum thickness for the super-lattice structure, although a thickness of from 50 nm to 2000 nm is preferred and a thickness of from 150 nm to 750 nm is more preferred depending upon the available amount of voltage.

The structures shown in FIG. 2 and the figures that follow show adjacent layers in contact with each other without intervening layers; however, additional layers can be utilized to the extent they do not interfere with the recited layers. Therefore, the terms coating and in contact do not exclude the possibility of additional intervening but non-interfering layers.

By embedding small semiconductor nano-particles in a semiconductor nitride matrix, e.g. a group IV semiconductor, such as silicon, nano-particles in a group IV semiconductor, such as silicon, nitride matrix, the radiative lifetime of the semiconductor nano-particles can approach the nanosecond and/or sub-nanosecond regime due to the effect of surface passivation of the nano-particles by nitrogen atoms, and the effect of strong coupling of electron and hole wave functions of the excitons. However, uniformly deposited SiN$_x$ films, in which semiconductor nano-particles are formed therein, generally have a relatively wide range of size, and a random spatial distribution, specifically the separation distances between nano-particles. In addition, semiconductor nano-particles formed in semiconductor nitride films may form connected small clusters when subjected to higher temperature, which would affect light emitting efficiency, thereby severely limiting device processing flexibility after film deposition. A combination of variations of nano-particles size and separation distance could result in significant impact on the electroluminescence efficiency of semiconductor nano-particles structures formed in such films.

In the films in which semiconductor nano-particles are embedded in a semiconductor nitride matrix, current conduction in the films might be significantly affected by the high trap density of the semiconductor nitride host and hence impose detrimental effects on the effectiveness of injected charge carriers to gain energy from the electrical field to create excitons in the semiconductor nano-particles. However, the engineered structure according to the present invention eliminates all of the aforementioned problems by providing buffer layers in between active layers of semiconductor nitride, thereby ensuring the proper distance between nano-particles. Moreover, providing thin active layers, i.e. nano-particle, size, the size of the nano-particles can be more closely controlled.

Figure 3:
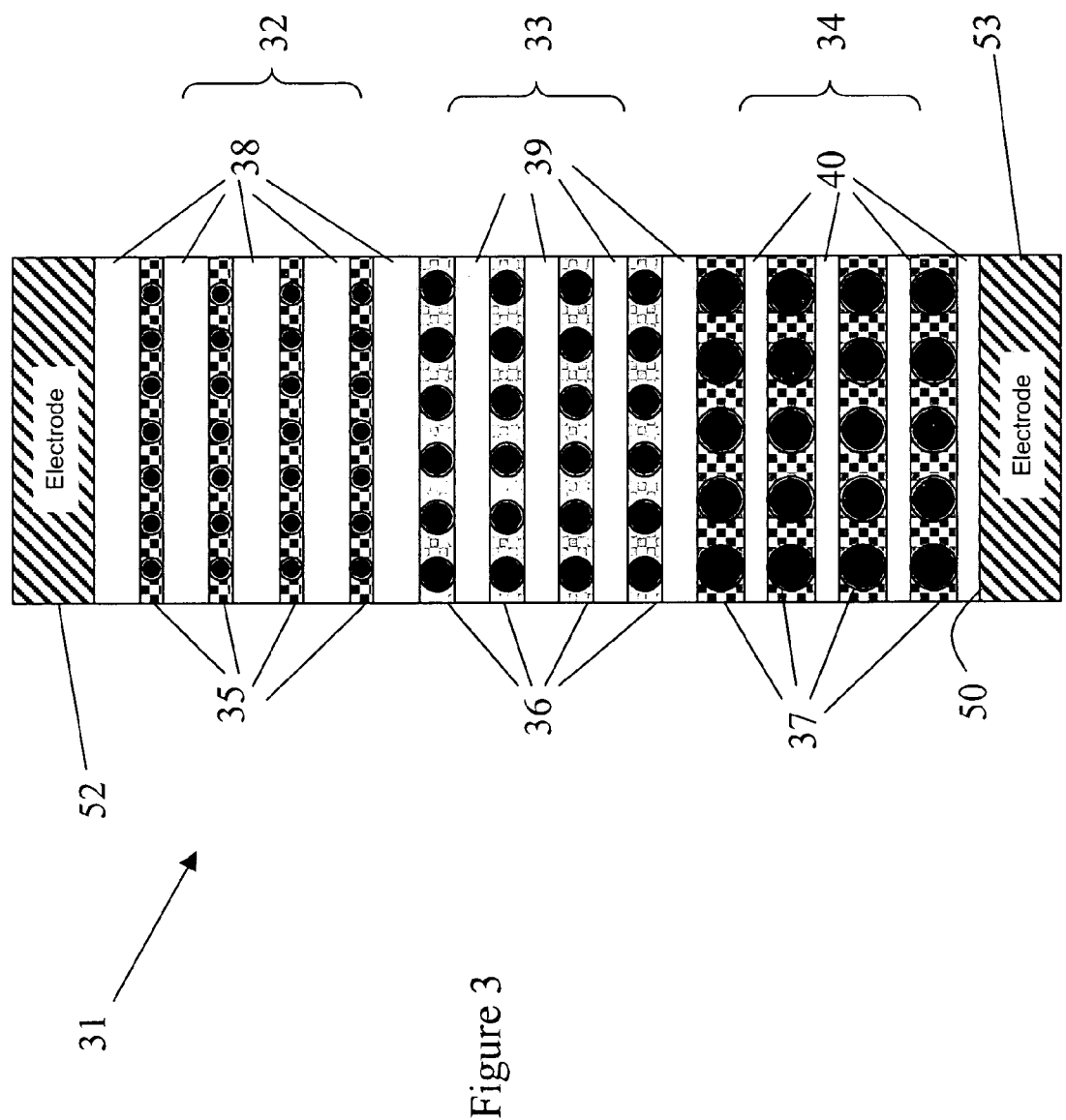
FIG. 3 is a cross-sectional view of an alternative super-lattice semiconductor structure in accordance with the device of FIG. 1.

With particular reference to FIG. 3, an engineered film structure 31, according to another embodiment of the present invention, is formed by a plurality of different stacks 32, 33 and 34 of organized layers, in which the active layers 35, 36 and 37 are separated by buffer layers 38, 39 and 40, respectively, comprised of a pure wide bandgap semiconductor or dielectric material.

For engineered film structures 31 driven by AC voltage, a pair of electrodes 52 and 53 are positioned on opposite sides of the stack of layers 35 to 40. Buffer layers 38 and 40 are disposed next to the electrodes 44 and 45, respectively, as the current will flow in both directions as the voltage oscillates. Ideally one of the electrodes, e.g. electrode 52, is transparent, e.g. ITO, and a reflective layer or coating 50 is added between one of the electrodes, e.g. electrode 53, and the remaining stack of layers 35 to 40 to reflect any light back through the transparent electrode 52.

The size of the nano-particles, e.g. nanocrystals, is approximately equal to the thickness of the active layer 35, 36 and 37 (or 12 and 14 above) in which they reside (+10%). The size of the nano-particles in each active layer 35, 36 and 37, i.e. the thickness of the active layer 35, 36 and 37, is designed for a specific excitation energy to produce a desired colored light emission. A theoretical relationship between nano-particle diameter d (in nanometers) and excitation energy E (in electron-volts) for silicon nano-particles in a silicon dioxide matrix host doped with rare earth is given by:

$$E=1.143+5.845/(d^2+1.274d+0.905)-6.234/(d^2+3.391d+1.412);$$

For example, ~1.9 eV for red photons (d=2.9 nm), ~2.3 eV for green photons (d=2.1 nm), or ~2.8 eV for blue photons (d=1.6 nm). The rare earth ion species placed within or next to a nano-particles layer is selected to radiate at a wavelength matched to the excitation energy of the nano-particles within the layer (or vice versa).

For group IV, e.g. silicon, nano-particles in a, group IV, e.g. silicon, nitride matrix host without rare earth doping or for group IV, e.g. silicon, nano-particles in a silicon dioxide matrix host without rare earth doping the excitation energy equation to generate a specific excitation energy to produce a desired colored light emission from the nano-particles has been shown to be:

$$E=E_0+C/d^2$$

Where $E_0$=1.16 eV and C=11.8 eV-nm$^2$

Accordingly, the thickness of the red light emitting layer, i.e. the diameter of the nano-particles in an active layer with silicon nano-particles in a silicon nitride matrix, is 4 nm, 3.25 nm for the green light emitting layer, and 2.6 nm for the blue light emitting layer.

The thickness of active layers without nano-particles is typically determined empirically based on a tradeoff between the energy requirements and the brightness of the light. On the one hand, if the active layer is infinitely thin then the energy would be precisely known for the whole layer and therefore energy matching could be optimized; however, if the active layer is infinitely thin, there would be no luminescent centers and no light. The thicker the active layer is, the brighter the layer can be, since there would be more luminescent centers per sq mm; however, the energy will not be optimum throughout the entire thickness so there will be a loss of efficiency.

The thickness of the buffer layers 38, 39 and 40 (or 13 above) are closely matched to the size of the nano-particles in the neighboring nano-particle active layers 35, 36 and 37 (or 12 and 14 above). For an electric field applied perpendicular to the plane of the layers 35 to 40, an electron must gain sufficient energy from the applied electrical field to excite the nano-particles to the correct energy—the energy gained in the buffer layers 38, 39 and 40 (measured in eV) is equal to the electric field multiplied by the thickness of the buffer layer 38, 39 or 40. For example, for an applied electrical field of 5 MV/cm, the thickness of the buffer layer must be 3.8 nm or thicker to excite a nano-particle to 1.9 eV (1.9 eV/0.5 eV/nm=3.8 nm), 4.6 nm or thicker to excite a nano-particle to 2.3 eV, or 5.6 nm or thicker to excite a nano-particle to 2.8 eV. For engineered film structures 31 powered by AC electrical power, in which neighboring nano-particle layers, e.g. 35 and 36, emit at different wavelengths, the intervening buffer layer, e.g. 38, must be thick enough to excite the nano-particles in the higher energy layer.

The engineered film structure 31 provides a great improvement in luminous flux (optical output power), efficiency (internal power conversion efficiency and external luminous efficacy), colour rendering index (CRI), device reliability and lifetime, and device manufacturability/cost/yield of solid state light emitting devices based on silicon nano-particles in a silicon oxide matrix and doped with rare earth ions and other impurities, such as carbon.

Rare earth ions may be incorporated into the active layers 35, 36 and 37, into the buffer layers 38, 39 and 40, or into both. The preferred structure incorporates rare earths only within the active layers 35, 36 and 37, with a concentration such that the efficiency of energy transfer from the nano-particles to the rare earth ions is maximized and the radiative emission efficiency of the excited rare earth ions is maximized. Due to the complexity of the physical processes involved, optimization is generally an empirical process. The rare earth ion species placed within or next to a nano-particle active layer is selected to radiate at a wavelength matched to the excitation energy of the nano-particles within the active layer (or vice versa). Preferably, the rare earth elements are a lanthanide element, such as cerium, praeseodymium, neodynium, promethium, gadolinium, erbium, thulium, ytterbium, samarium, dysprosium, terbium, europium, holmium, or lutetium; however, they can also be selected to be an actinide element, such as thorium.

Other impurities, if required, will typically be incorporated only within the nano-particle active layers 35, 36 or 37, although they could be placed anywhere within the structure 31. For example, since observations have determined that the measured excitation energy of a nano-particle is not as high as expected theoretically, carbon atoms may be required to raise the excitation energy of the nano-particles transferred to the rare earth ions in the wide bandgap semiconductor or dielectric, e.g. silicon oxide, matrix.

The buffer layers 38, 39 and 40 should be of the highest quality, i.e. dense with few defects, achievable with such materials, within the capabilities of a specific processing technology, whereby the device lifetime and reliability under a high applied electric field will be maximized.

Silicon-rich silicon oxide, with or without carbon and rare earth doping, for the active layers 35, 36 and 37, and silicon dioxide for the buffer layers 38, 39 and 40 are the preferred materials in the engineered film structure. Other material systems, such as silicon-rich silicon nitride with or without rare earth doping for the active layers 35, 36 and 37, and silicon nitride for the buffer layers 38, 39 and 40, can also be used in this engineered structure. Rare earth oxides, which also contain luminescent centers, can also be used in the active layers 35, 36 and 37.

The density of the nano-particles in any layer can be changed by varying the excess silicon content in said layer during deposition and by varying the annealing conditions (annealing temperature and time, for example). The nano-particle density, within the nano-particle layers 35, 36 and 37, is preferably as high as possible to increase the intensity of emitted light, while still remaining below the density that would result in interactions between nano-particles, or agglomeration of nano-particles.

The total number of repeated layers 35 to 40 in the structure 31 is determined by the voltage that will be applied to the entire film and by the electric field required for efficient and reliable operation. In a simple approximation, very little voltage is dropped across the nano-particles active layers 35, 36 and 37, so that the number of layers required will be equal to the applied voltage divided by the electric field and divided by the thickness of the buffer layers 38, 39 and 40. For example, if the applied voltage is 110 V, the desired electric field within one dielectric layer 39 is 5 MV/cm (i.e. 0.5 V/nm), and the desired excitation energy is 2.3 eV, whereby the nano-particle active layer 36 is 2.1 nm thick and the dielectric layer is 4.6 nm thick, then the total number of repeated layer pairs 36/39 is:

(110 V)/(0.5 V/nm)/(4.6 nm)=48 layers or pairs.

A single colour can be emitted by an engineered film structure by repeating identical pairs of active and dielectric layers, e.g. multi-layer structure 20 with identical active layers 12 and 14. Mixed colors, e.g. white, can be emitted by the engineered structure 31, since the entire film will comprise several layer pairs for each constituent colour. For example, N pairs of active/dielectric layers altogether may comprise k pairs for blue 35/38, m pairs for green 36/39, and n pairs for amber/red/orange 37/40, where k+m+n=N. The number of each of the colour pairs, e.g. 35/38, 36/39 and 37/40, can be varied so that any desired color rendering index (CRI) can be achieved. For example, a warm white requires more pairs of red than blue 35/38, while a cool white requires the opposite.

For white or other multi-colour light emission, and for a device 31, in which a back reflector 50 is included in the structure, it is preferable to place the lowest energy (longest wavelength, e.g. red) emission layers nearest to the reflector 50 and the highest energy (shortest wavelength, e.g. blue) layers nearest to the emitting surface. Layers emitting intermediate wavelengths, e.g. green, are placed intermediate the layers emitting the longest and shortest wavelengths.

Figure 4:
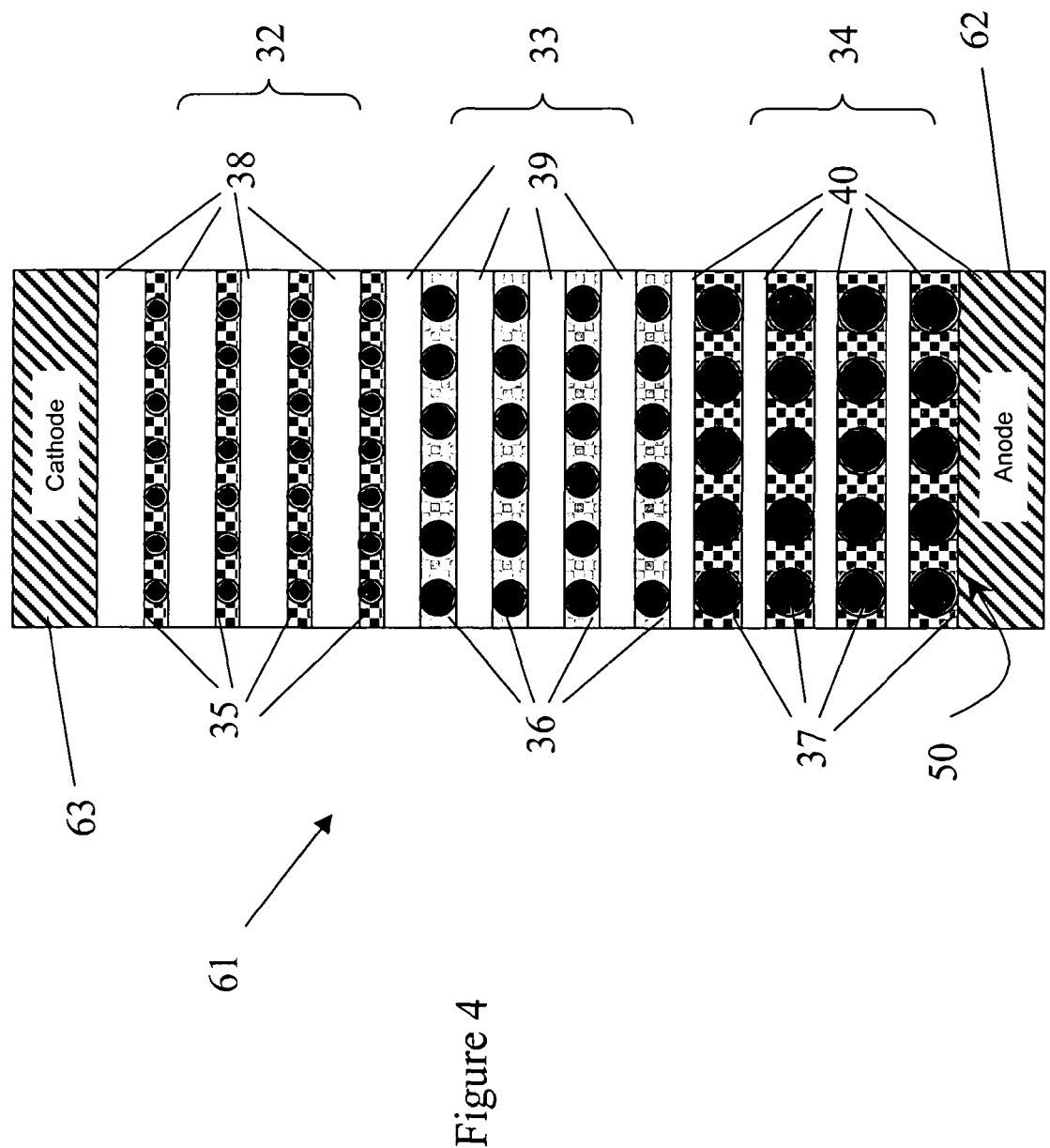
FIG. 4 is a cross-sectional view of an alternative super-lattice semiconductor structure in accordance with the device of FIG. 1.

FIG. 4 illustrates an engineered film structure 61 powered by DC electrical power, i.e. an anode 62 and a cathode 63. The active layers 35, 36 and 37 and most of the buffer layers 38, 39 and 40 are identical to those in the engineered film structure 31; however, since the electrons only travel in one direction, the intervening buffer layers between different types of active layers must be the correct thickness to excite the nano-particles in the nano-particle active layer closer to the anode 62. Accordingly, the engineered film structure 61 is preferably terminated by one of the first buffer layers 38 at the cathode 63 and by a nano-particle layer 37 at the anode 62. Moreover, since the electrodes travel only in one direction, i.e. from the cathode to the anode, one of the second buffer layers 39 is between the first stack 32 and the second stack 33, and one of the third buffer layers 40 is between the second stack 33 and the third stack 34.

Process Details

Any process technology used to deposit the multi-layer film structures 20, 31 or 61 must be capable of varying the film composition on a scale of approximately 1 nm. The preferred deposition technology is plasma enhanced chemical vapor deposition (PECVD), preferably enhanced by electron cyclotron resonance (ECR-PECVD) or by an inductively coupled plasma (ICP-PECVD). Alternatively metal-organic chemical vapor deposition (MOCVD). Other deposition technologies with the required capability are molecular beam epitaxy (MBE); chemical beam epitaxy (CBE); atomic layer epitaxy (ALE); and pulsed laser deposition (PLD), also called pulsed laser epitaxy (PLE). There are many other thin film growth processes that are variations on the techniques described above. Any of these techniques may also be suitable for deposition of the structured films described in the previous section.

In our original homogeneous structure, nano-particle size is affected by excess silicon concentration, annealing temperature and time, i.e. increasing any of these increases nano-particle size, and possibly by other components of the film, e.g. carbon. In the case of the engineered structure with silicon-rich active layers, the size in the direction perpendicular to the planes is limited by the thickness of the silicon-rich layer and should approximately equal it, unless the excess silicon content is very low. Annealing also has an effect, but that effect will be curtailed once the nano-particle size is roughly equal to the deposited layer thickness, i.e. it could only grow parallel to the plane, and only very slowly. Impurity content may also still have an effect.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

We claim:

1. A light emitting structure comprising:
   a layer stack including:
      a first active layer including a concentration of luminescent centers, for emitting light at a first wavelength, requiring a first excitation energy characteristic of the first active layer; and
      a first buffer layer comprising a wide bandgap semiconductor or a dielectric material adjacent to the first active layer; and
   a set of electrodes for applying to the layer stack an electric field for excitation of light emission;
   wherein the first buffer layer has a first thickness, in the direction of the electric field, proportionally matched to on the first excitation energy, and
   wherein electrons gain energy from the electric field, when passing through the first buffer layer, proportional to the first thickness and matched to the first excitation energy, to excite the luminescent centers in the first active layer via impact ionization or impact excitation substantially at said first excitation energy for light emission at the first wavelength.

2. The light emitting structure according to claim 1, wherein the layer stack further comprises:
   a plurality of additional first active layers; and
   a plurality of additional first buffer layers of said first thickness, forming a first stack with first active layers alternating with first buffer layers between the set of electrodes.

3. The light emitting structure according to claim 2, wherein the set of electrodes are powered by an alternating current power source; and wherein one of the first buffer layers is disposed at each end of the first stack to ensure that the luminescent centers in all of the first active layers are excited when the electric field changes direction.

4. The light emitting structure according to claim 2, wherein the layer stack further comprises:
   a plurality of second active layers, each including a concentration of luminescent centers, which are different from the luminescent centers in the first active layers, for emitting light at a second wavelength, which is different from the first wavelength, and requiring a second excitation energy, different than the first excitation energy and characteristic of the second active layer; and
   a plurality of second buffer layers comprising a wide bandgap semiconductor or dielectric material interleaved with the plurality of second active layers, forming a second stack between the set of electrodes;
   wherein each of the second buffer layers has a second thickness, proportionally matched to the second excitation energy, and different from the first thickness of each first buffer layer, wherein electrons gain energy from the electric field when passing through the second buffer layers proportional to the second thickness and matched to the second excitation energy to excite the luminescent centers in the second active layers via impact ionization or impact excitation, substantially at the second excitation energy to emit light at the second wavelength.

5. The light emitting structure according to claim 4, wherein the set of electrodes are powered by an alternating current power source; and wherein one of the first buffer layers is disposed at an outer end of the first stack, one of the second buffer layers is disposed at an outer end of the second stack, and one of the first or second buffer layers, whichever is larger, is positioned between the first and second stacks to ensure that the luminescent centers in all of the first and second active layers are excited when the electric field changes direction.

6. The light emitting structure according to claim 4, wherein the first and second wavelengths are combined with or without additional wavelengths to form white light.

7. The light emitting structure according to claim 1, wherein the layer stack further comprises:
a second active layer including a concentration of luminescent centers for emitting light at a second wavelength, requiring a second excitation energy, which is different than the first active layer and characteristic of the second active layer; and
a second buffer layer comprising a wide bandgap semiconductor or a dielectric material adjacent the second active layer;
wherein the second buffer layer has a second thickness, in the direction of the electric field, matched in proportion to the second excitation energy;
wherein electrons gain energy from the electric field when passing through the second buffer layer proportional to the second thickness and matched to the second excitation energy to excite the luminescent centers in the second active layer via impact ionization or impact excitation, substantially at said second excitation energy for light emission at the second wavelength.

8. A light emitting structure according to claim 7, wherein the ratio of the first excitation energy to the first thickness is substantially equal to the ratio of the second excitation energy to the second thickness.

9. The light emitting structure according to claim 1, wherein the first active layer comprises semiconductor nano-particles dispersed within a wide bandgap semiconductor or dielectric host matrix, each nano-particle having a diameter substantially equal to the thickness of the first active layer.

10. The light emitting structure according to claim 9, wherein the diameter of the semiconductor nano-particles corresponds to the excitation energy of the semiconductor nano-particles, which corresponds with the first wavelength.

11. The light emitting structure according to claim 10, further comprising a second active layer comprising semiconductor nano-particles dispersed within a wide bandgap semiconductor or dielectric host matrix, each nano-particle having a diameter substantially equal to a thickness of the second active layer; and
a second buffer layer adjacent the second active layer, wherein the second buffer layer has thickness, whereby electrons gains sufficient energy from the electric field to excite the semiconductor nano-particles in the second active layer at an excitation energy to emit light at a second wavelength, which is different than the first wavelength;
wherein the diameter of the semiconductor nano-particles in the second active layer corresponds to the excitation energy of the semiconductor nano-particles in the second active layer, which corresponds with the second wavelength.

12. The light emitting structure according to claim 11, further comprising:
a plurality of additional first active layers;
a plurality of additional first buffer layers forming a first stack with first active layers alternating with first buffer layers between the set of electrodes;
a plurality of additional second active layers; and
a plurality of additional second buffer layers forming a second stack with second active layers alternating with second buffer layers between the set of electrodes.

13. The light emitting structure according to claim 12, further comprising:
a plurality of third active layers, each of the third active layers having semiconductor nano-particles in a host matrix defined by a third thickness, each of the semiconductor nano-particles in the third active layers having a diameter substantially equal to the third thickness, the diameter of the semiconductor nano-particles in the third active layer corresponding to the excitation energy of the semiconductor nano-particles, which corresponds with a third wavelength different from the first and second desired wavelengths; and
a plurality of third buffer layers comprising a wide bandgap semiconductor or dielectric material separating the plurality of third active layers from each other, each of the third buffer layers having a thickness whereby an electron gains sufficient energy when passing therethrough from the electric field to excite the semiconductor nano-particles in the third active layer at an excitation energy to emit light at the third wavelength.

14. The light emitting structure according to claim 12, further comprising a second active layer comprises semiconductor nano-particles dispersed within a wide bandgap semiconductor or dielectric host matrix, each nano-particle having a diameter substantially equal to the thickness of the second active layer;
wherein the second active layer is doped with a second rare earth material, different than the first, selected to radiate at a wavelength matched to the excitation energy of the nano-particles in the second active layer, whereby energy is transferred from the nano-particles to the second rare earth material, which emits light at the second wavelength.

15. The light emitting structure according to claim 14, further comprising:
a plurality of additional first active layers;
a plurality of additional first buffer layers forming a first stack with first active layers alternating with first buffer layers;
a plurality of additional second active layers; and
a plurality of additional second buffer layers forming a second stack with second active layers alternating with second buffer layers.

16. The light emitting structure according to claim 15, further comprising:
a plurality of third active layers, each of the third active layers having semiconductor nano-particles in a host matrix defined by a third thickness, each of the semiconductor nano-particles in the third active layers having a diameter substantially equal to the third thickness, the diameter of the semiconductor nano-particles in the third active layer corresponding to the excitation energy of the semiconductor nano-particles, which corresponds with a third wavelength different from the first and second desired wavelengths; and a plurality of third buffer layers separating the plurality of third active layers from each other, each of the third buffer layers having a thickness whereby an electron gains sufficient energy when passing therethrough from the electric field to excite the semiconductor nano-particles in the third active layer at an excitation energy to emit light at the third wavelength.

17. The light emitting structure according to claim 16, wherein the first desired wavelength falls within a range of red wavelengths;

wherein the second desired wavelengths falls within a range of green wavelengths;

wherein the third desired wavelength falls within a range of blue wavelengths;

whereby substantially white light is emitted from the combination of the first, second and third desired wavelengths.

18. The light emitting structure according to claim 17, wherein the set of electrodes comprises a first transparent electrode, and a second base electrode; wherein the light emitting structure further comprises a reflective layer, between the second base electrode and the first transparent electrode, for reflecting light back through the first transparent electrode.

19. The light emitting structure according to claim 18, wherein the plurality of active layers emitting light at a longest wavelength are disposed nearest to the reflector layer, and the active layers emitting light at a shortest wavelength are disposed nearest to the first transparent electrode.

20. The light emitting structure according to claim 9, wherein the first active layer is doped with a first rare earth material selected to radiate at a wavelength matched to the excitation energy of the nano-particles in the first active layer, whereby energy is transferred from the nano-particles to the first rare earth material, which emits light at the first wavelength.

21. The light emitting structure according to claim 1, wherein the first active layer comprises group IV nano-particles in a silicon dioxide matrix host.

22. The light emitting structure according to claim 21, wherein the first active layer is doped with a rare earth element, selected to radiate at a wavelength matched to the excitation energy of the nano-particles in the first active layer, whereby energy is transferred from the nano-particles to the rare earth material, which emits light at the first wavelength.

23. The light emitting structure according to claim 1, wherein the first active layer comprises group IV nano-particles in a silicon nitride matrix host.

24. The light emitting structure according to claim 1, wherein the first active layer comprises an oxide of a rare earth element.

25. The light emitting structure according to claim 24, wherein the rare earth element is selected from the group consisting of cerium, praeseodymium, neodynium, promethium, gadolinium, erbium, thulium, ytterbium, samarium, dysprosium, terbium, europium, holmium, lutetium, and thorium.

26. The light emitting structure according to claim 1, wherein the set of electrodes comprises a first transparent electrode, and a second base electrode; wherein the light emitting structure further comprises a reflective layer, between the second base electrode and the first transparent electrode, for reflecting light back through the first transparent electrode.

27. The light emitting structure according to claim 1, wherein for emission of light at the first wavelength requiring excitation of luminescent centers in the first active layer at the first excitation energy, and for electron energy gain in the first buffer layer equivalent to the electric field multiplied by the first thickness of the first buffer layer and substantially equal to the first excitation energy, the first thickness is substantially equal to the first excitation energy divided by the electric field.

28. The light emitting structure according to claim 1, wherein the first active layer consists of an oxide of a rare earth element.

29. The light emitting structure according to claim 1, wherein the luminescent centers in the first active layer comprise a rare earth species.

30. An electroluminescent light emitting structure comprising:

a layer stack comprising:

at least one first active layer including a concentration of luminescent centers in a host matrix for emitting light at a first wavelength requiring a respective first excitation energy, characteristic of the first active layer; and a respective first buffer layer comprising a wide bandgap semiconductor or a dielectric material adjacent each first active layer; and a set of electrodes for applying an electric field for excitation of the layer stack;

wherein each first buffer layer has a first thickness, in a direction of the electric field, substantially equal to the first excitation energy divided by the electric field, wherein electron energy gain from the electric field in passing through the first thickness of each a buffer layer is proportional to the first thickness and matched to said first excitation energy for excitation of the luminescent centers in the adjacent first active layer for light emission at the first wavelength.

31. An electroluminescent light emitting structure according to claim 30, wherein the layer stack further comprises:

at least one second active layer including a concentration of luminescent centers, in a host matrix material for emitting light at a second wavelength, requiring a respective second excitation energy, different from the first excitation energy, and characteristic of the second active layer, and a second buffer layer comprising a wide bandgap semiconductor or a dielectric material adjacent each second active layer;

wherein each second buffer layer has a second thickness in a direction of the electric field substantially equal to the second excitation energy divided by the electric field and different from the first thickness, wherein electrons energy gain from the applied electric field in passing through the second thickness of the second buffer layer is proportional to the second thickness and matched to said second excitation energy from the applied electric field for excitation of the luminescent centers in the adjacent second active layer for light emission at the second wavelength.

* * * * *